Jan. 21, 1958 C. S. SHUMAKER 2,820,518
RECIPROCATING SHEAR OVERLOAD DEVICE
Filed Jan. 6, 1955 2 Sheets-Sheet 2

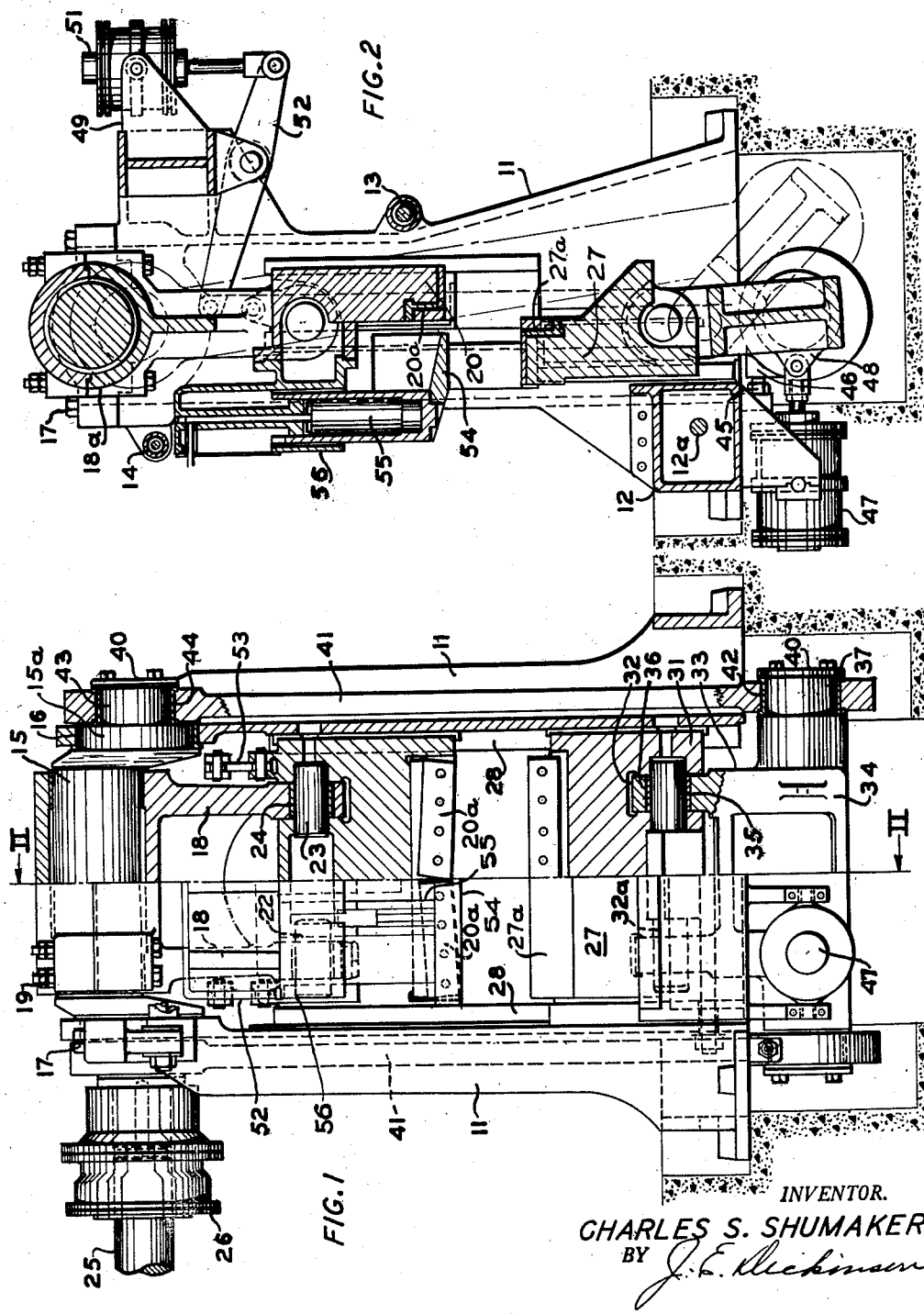

INVENTOR.
CHARLES S. SHUMAKER
BY
HIS ATTORNEY

United States Patent Office 2,820,518
Patented Jan. 21, 1958

2,820,518
RECIPROCATING SHEAR OVERLOAD DEVICE

Charles S. Shumaker, Library, Pa., assignor to United Engineering and Foundry Company, Pittsburgh, Pa., a corporation of Pennsylvania Application January 6, 1955, Serial No. 480,203

11 Claims. (Cl. 164—47)

This invention relates to an overload release device and in particular to a device adapted to be used in combination with a shear of the reciprocating type in which one of the cutting elements is operatively connected to an eccentric driven element and the other cutting element normally maintained stationary.

In the operation of such apparatus in which the force delivered by the eccentric crank may be infinite, there is frequently developed objectional stresses which are brought about by an overloading of the machine in which the force necessary to perform the work is in excess of the ability of many of the elements of the machine to withstand resulting in the failure thereof.

While not necessarily so limited in its use, the device embodying the features of this invention is especially adapted to be employed in conjunction with a reciprocating eccentrically driven shear and, particularly, a shear of that type which is designed to shear material of various sizes and metallurgical characteristics. In the shearing of material of such a class, there are certain shearing operations in which the shear knife pressure required for the shearing of a particular workpiece is in excess of what the shear was designed to operate under and, although the eccentric may be capable of delivering the required force necessary to shear a particular workpiece, many of the other elements of the shear may be damaged when excessive knife pressure is developed and imposed upon the various shear elements.

It is therefore an object of this invention to provide an overload release device operatively associated with an eccentrically driven machine, having at least one reciprocating element, by which an overload condition in the operation thereof will be automatically relieved.

It is a further object of this invention to provide a pair of links arranged to support the normally stationary shearing element of an eccentrically driven reciprocating shear, the element supported thereby being off-center with respect to the centerline of the links and the links having connected thereto a yieldable pressure means for maintaining the links and the shearing element in the normal shearing position.

It is still a further object of this invention to provide a simple but highly dependable overload release device which is automatic in operation, requiring no attention either in the operating or resetting phase.

These objects, as well as the various other novel features and advantages of this invention, will become apparent from the following description and accompanying drawings in which:

Figure 1 is a front elevational view part in section of a reciprocating shear incorporating an overload release device embodying the inventions disclosed herein;

Figure 2 is a sectional view taken on line II—II of Figure 1, and

Figure 3:
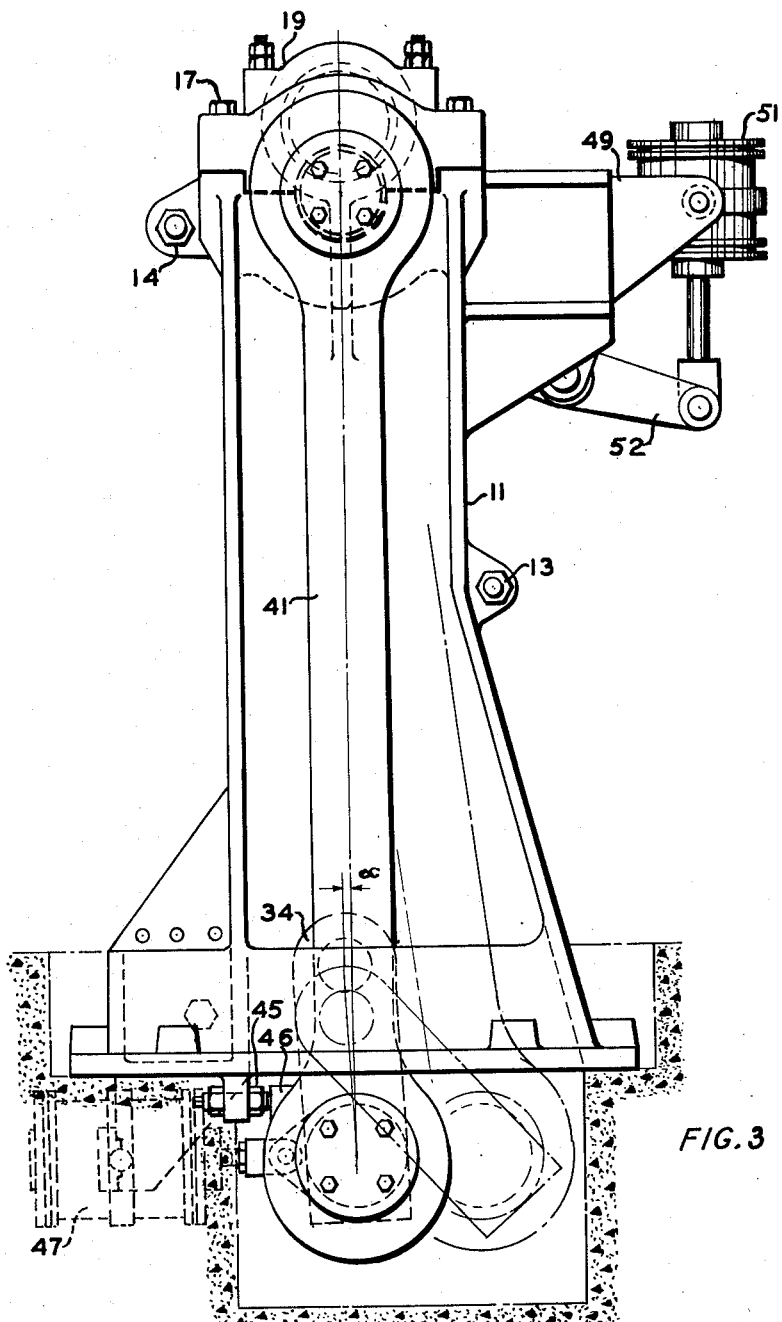
Figure 3 is an end elevational view of the shear shown in Figures 1 and 2.

With reference to Figures 1, 2 and 3, an overload release device embodying the features of the invention herein disclosed is shown in combination with a reciprocating shear which comprises a two-piece vertically disposed housing 11 having hollow center portions, a broad base and a somewhat narrow top portion. The housings, as shown, are spaced apart, mounted on suitable foundations and tied together at the bottom by means of a spacing member 12 and having tension bolts 12a passing therethrough. Two rod type spacers 13 and 14 secure the housings together at the sides and top respectively, spacers 13 and 14 being placed on opposite sides of the housing as shown in Figure 2. The top of the housings are recessed to form a half cylindrical opening into which there is received the concentric end portions 15a of an eccentric shaft 15, the shaft being supported in bearings 16 provided with bearing caps 17.

On the center eccentric portion of the shaft 15 there is mounted a pair of pitman arms 18 the tops of which are integrally connected to a continuous half-cylindrical recessed member 18a having bearings at the outer ends into which the eccentric portion of the shaft 15 is rotatable within and secured thereto by a one-piece bearing cap 19. The lower ends of the pitman are connected to an upper reciprocable blade carrier 20, slots 21 being provided into which the lower pitman ends are received and with openings 22 into which the outer ends of connecting pins 23 extend on passage through suitable bushings 24 secured within openings in the pitman arms. A suitable drive, or motor and drive, not shown, is employed for driving the eccentric shaft 15, being connected thereto by a shaft 25 and coupling 26. As in other shears of this type, the pitman arms and shear blades are so arranged with respect to the eccentric shaft that maximum shearing pressure for which the shear is designed can be delivered at approximately the center of the downward stroke. However, the eccentric driving arrangement is capable of delivering a pressure greater than that for which the shear is designed inasmuch as the pressures at the blades may become infinitely great as the shear blade approaches the lowermost position of its shearing stroke. Unless an overload or safety device is incorporated in such a shear, breakage of certain of the shear elements will occur.

Spaced apart from the upper blade carrier and with the shear blade thereof in direct alignment with the blade of the upper carrier, there is a lower blade carrier 27 which is positioned between two guides 28 secured to the inner portions of the housings and between which the upper blade carrier 20 is mounted and along which it slides during reciprocation. Although during normal shearing operations the carrier 27 remains stationary, should abnormal pressures be imposed upon the shear blades, then the lower carrier is adapted to slide downward along the guides to avoid breakage of certain of the shear parts. As shown, the upper carrier 20 is provided with a split raked blade 20a and the lower carrier 27 with a straight blade 27a. The lower carirer 27 is provided with two downwardly extending projections 31 having slots 32 cut therein with openings 32a communicating therewith. Twin link portions 33 of a connecting member 34 are inserted in the slots 32 and the links thereof connected to the carrier 27 by means of pins 35 inserted in the openings 32a of the carrier and passed through the bushings 36 mounted in the links thereby to provide for free pivotal movement of the member 34.

The lower end of the member 34 is provided with stub shaft extensions 37 which are pivotally connected to the lower ends of a pair of links 41 provided with bushings 44 mounted therein and within which the shaft ends 43 freely pivot. The links are secured to the stub and eccentric shafts by end plates 40 fastened to the shafts by suitable studs. From the construction illustrated and described, it will be appreciated that the shearing force will be imposed upon and absorbed by the links 41 so as to relieve the housings 11 thereof. The housings themselves function solely to support the parts of the shear and they are subjected only to secondary forces such as those incident to guiding and friction of the moving parts.

Attention is directed to the particular relationship of the pivot pins 35, the links 41 and the direction of the path of travel of the cutting edge of the blades of each of the carriers 20 and 27 as best shown in Figure 3. The links 41 in this particular arrangement are arranged on-center with respect to the path of travel of the cutting edge of the blade carried by the upper carrier 20 and the pivot pins 35 off-center with respect thereto. To prevent the links from moving too far to the left, a pair of adjustable stops 45 are secured to the lower portion of the housing and engage with abutments 46 provided on the links.

Beneath the frame 11, as shown in Figures 1 and 2, there are two piston-cylinder assemblies 47 mounted in suitable trunnions supported in brackets secured to and extending downward from the housing. The piston rods of each of the assemblies are pivotally connected to brackets 48 projecting horizontally from the member 34. By this arrangement, the member 34 and the lower blade carrier 27 pivotally connected thereto are maintained in the normal position for shearing, sufficient pressure being applied to the piston-cylinder assemblies 47 to prevent displacement downward of the lower blade carrier 27 when maximum allowable shearing pressures are applied to the blades. The shear elements are thus maintained in positions relative to each other as explained hereinbefore, the links 41 being maintained in their normal on-center position with respect to the path of travel of the cutting edge of the upper shear blade and off-center with respect to the pivot pins 35 so that a horizontal component defined by the angle α will be imposed upon the links during shearing which will be in opposition to the holding back force provided by the piston-cylinder assemblies 47.

Though the arrangement of the elements has thus been defined, it is obvious that the off-center relationship thereof could be varied and still accomplish the same resulting action. For example, the pivot pins 35 could be arranged in an on-center relationship with respect to the path of travel of the top blade and the links 41 maintained in an off-center position with respect to the blade path of travel so that the horizontal component of the shearing pressure would be transmitted to the links in somewhat the same manner as provided for in the present arrangement.

As shown in Figure 2 the shear is also provided with a top blade carrier balance consisting, in the instant case, of a pair of piston-cylinder assemblies 51 mounted in trunnions on brackets 49 connected to the top blade carrier 20 by means of links 52 and 53 arranged to provide a lifting force on the carrier thereby to maintain the pins 23 and bushings 24 in positive engagement during a complete rotation of the crank. There is also provided a gag mechanism comprising a vertically actuated gag 54 positioned directly above the lower carrier 27 and adapted to move downwardly with the upper carrier and to engage with the workpiece extending through the shear opening, there being connected to the gag 54 a dash pot 55 mounted in guides 56 connected to the housing.

The operation of the overload release mechanism may be briefly summarized as follows:

Under normal operations involving shearing pressures not in excess of the maximum for which the shear is designed, the overload release mechanism associated with the shear will be maintained in the position as shown in full lines on Figure 2 and the lower blade carrier 27 maintained stationary. However, should a workpiece be inadvertently inserted in the shear which would require shearing pressures tending to overload the shear, as soon as the maximum allowable pressure for the shear is exceeded, the horizontal component of the shearing force as applied to the pins 35 due to their offset condition defined by the angle α will be sufficient to overcome the force supplied by the piston-cylinder assemblies 47, thereby causing the member 34 and the links 41 connected thereto to swing outward toward the right and the lower blade carrier 27 to move downward along with the upper blade carrier and the workpiece gripped between the blades thereof. As the member 34 swings outward the angle α increases rapidly so that complete withdrawal downward of the lower blade carrier will be effected. On removal of the unsheared workpiece from the shear, the piston-cylinder assembly 47 will automatically retract the links to their normal operating positions and the lower carrier will be moved upward to its normal shearing position and loaded in readiness for subsequent operations.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. An overload release device for use in combination with a pair of work performing elements one of which is normally stationary and the other reciprocable relative thereto comprising yieldable means operably connected to said non-reciprocable element for maintaining said element in its normal working position and on the imposition of an overload upon said elements permitting displacement of said normally stationary element at an increasing rate in the same direction and by the same additional distance as said reciprocable element moves thereby to relieve said elements of the overload condition.

2. An overload release device according to claim 1 in which said yieldable means include a pair of links pivotally connected to and supporting said displaceable work performing element.

3. An overload release device according to claim 1 wherein said yieldable supporting means is operatively arranged to be influenced by a component of the working pressure imposed upon said displaceable work performing element.

4. An overload release device according to claim 2 in which hydraulic power means under constant pressure is connected to said links and adapted to prevent movement of said links during the normal working operation and permit displacement thereof on application of an overload to said work performing elements.

5. An overload release device according to claim 1 wherein connecting means are provided for pivotally connecting said yieldable supporting means to said displaceable work performing element in which the pivot point of said connecting means and said displaceable element is off-center with respect to the direction of application of the working pressure imposed upon said elements.

6. An overload release device according to claim 1 in which an adjustable stop means is operably arranged to engage with and establish the loading conditions of said yieldable means.

7. A vertical shear having a frame, an upper blade carrier and a lower blade carrier slidably mounted within said frame, means for reciprocating said upper blade carrier to place the blade carried thereby into and out of cutting relationship with the blade of said lower carrier, a pair of links pivotally supported at their upper ends by said frame, and yieldable means pivotally interconnecting the lower ends of said links to the lower blade carrier normally preventing movement of said lower blade carrier and operably arranged on subjecting the shear to an overload to permit said links to pivot about their upper ends and to cause said lower blade carrier to move downward together with said reciprocable blade carrier at an increasing rate away from the normal shearing position thereby to relieve the shear of the overload condition.

8. A vertical shear according to claim 7 in which a pair of guides are provided between the shear frame and the blade carriers.

9. A vertical shear according to claim 7 in which a member is pivotally connected between the lower ends of said links and said lower blade carrier and also pivotally connected to said yieldable means.

10. A vertical shear according to claim 9 in which the point at which the member is pivotally connected to said lower shear blade is out of the plane of the path of travel of the blade of the reciprocating carrier and the links so arranged that the centerline thereof is within the plane containing the path of travel of the cutting edge of said movable blade.

11. A vertical shear having a frame, an upper blade carrier and a lower blade carrier slidably mounted within said frame, a driven crank shaft connected to and for reciprocating said upper blade carrier to place the blade carried thereby into and out of cutting relationship with the blade of said lower carrier, a pair of links pivotally connected at their upper ends to concentric portions of said crankshaft, a member pivotally interconnecting the lower blade carrier and the lower ends of said links, and yieldable means operably connected to said member to maintain the lower carrier in its normal stationary shearign position within said frame and operably arranged on subjecting the shear blade carriers to an overload to permit said links to pivot about said crankshaft and to cause said lower blade carrier to move downward together with the reciprocable blade carrier at an increasing rate away from the normal shearing position thereby to relieve the shear of the overload condition.

References Cited in the file of this patent

UNITED STATES PATENTS

| | | |
|---|---|---|
| 835,998 | Wilzin | Nov. 13, 1906 |
| 1,121,886 | Wittlinger | Dec. 22, 1914 |
| 2,164,640 | Cannon | July 4, 1939 |
| 2,633,197 | Nischan | Mar. 31, 1953 |

FOREIGN PATENTS

| | | |
|---|---|---|
| 1,516 | Great Britain | Oct. 4, 1906 |
| 374,078 | France | June 4, 1907 |